Figure 1:
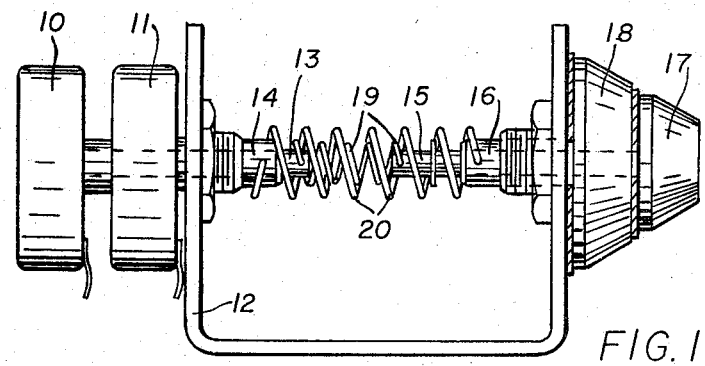

Aug. 23, 1966   R. H. TANNER ET AL   3,267,749
GANGED CONTROL WITH VARIABLE ANGULAR DIFFERNCE
Filed Dec. 9, 1963   2 Sheets-Sheet 2
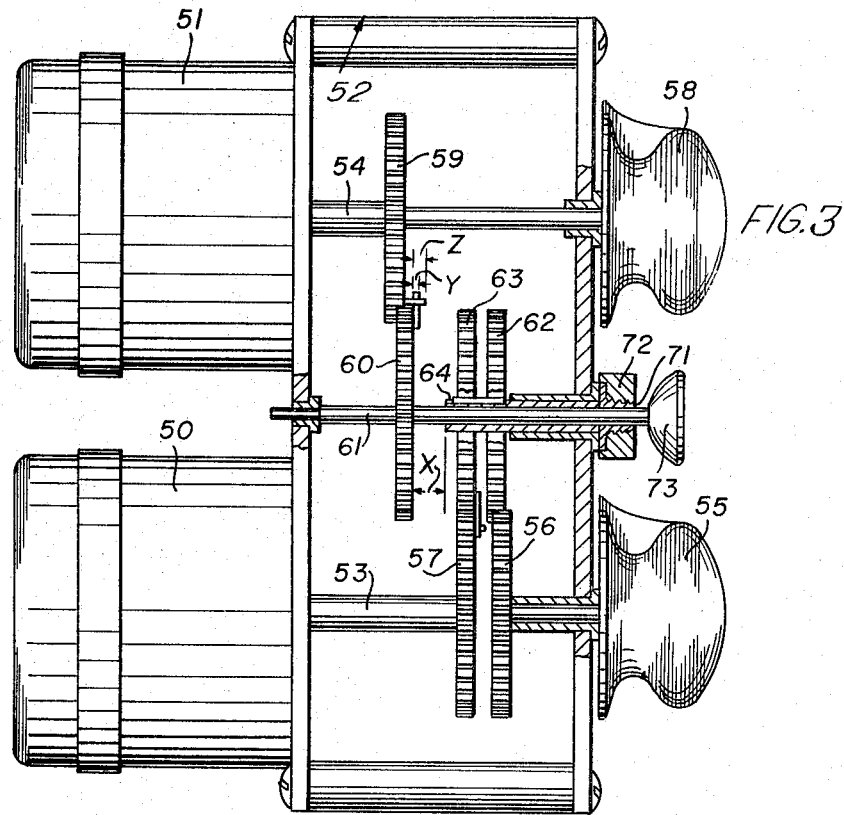
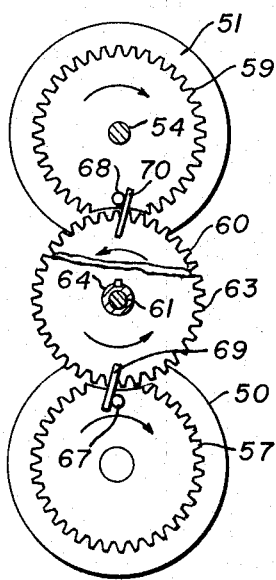
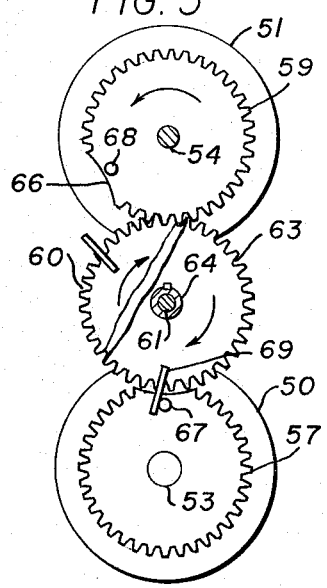
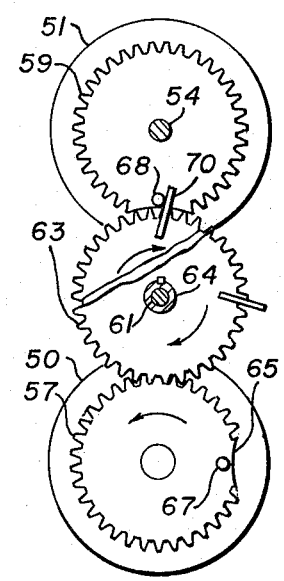
INVENTORS
ROBERT H. TANNER & SYDNEY M. K. HORNE
BY— Smart & Biggar. ATTORNEYS

United States Patent Office 3,267,749
Patented August 23, 1966

3,267,749
GANGED CONTROL WITH VARIABLE ANGULAR DIFFERENCE
Robert H. Tanner and Sydney M. K. Horne, both of Ottawa, Ontario, Canada, assignors to Northern Electric Company Limited, Montreal, Quebec, Canada
Filed Dec. 9, 1963, Ser. No. 328,954
8 Claims. (Cl. 74—10.45)

This invention relates to a drive mechanism for ganged controls and more particularly to such a mechanism which may be used to drive a plurality of controls having an adjustable angular difference between them.

In the electrical field and in other fields, it is often desirable to be able to vary two or more rotatable controls from a single source. Such is the case in the reproduction of stereophonic sound, where the volume controls of both the right and left channels are generally varied by turning a single control knob. The controls, in this case potentiometers, are fitted with stops which prevent their rotation beyond a minimum volume or zero gain setting. It is also desirable to be able to alter the balance between the two channels to compensate for differences in gain of the channels. One way of accomplishing this is by means of a friction coupling which connects the rotatable shafts of the controls together. Balance between the two channels is achieved by overcoming the friction of the coupling and rotating one control shaft with respect to the other, thereby setting up an angular difference between the two controls. A disengageable gear drive may also be used to perform the same function.

This system has the disadvantage that it is impossible to turn both controls to their zero gain settings if an angular difference exists between them without destroying the balance between the two channels and bringing all the controls in line. It is then necessary to reset the angular difference between the two controls when they are again advanced to their previous setting in order to restore the original balance.

This disadvantage has been overcome in the present invention by providing a drive mechanism which will rotate all the controls with various angular settings to their respective stop positions by a single control knob and then automatically restore the angular setting when the controls are again advanced by rotation of the knob. Such a drive mechanism is particularly useful for varying electrical controls such as ganged potentiometers in a stereophonic sound system. The two potentiometers can each be set to a fixed angular setting and then simultaneously rotated to their stop positions and then back to their original settings by a single control knob without upsetting the angular difference between them.

Figure 2:
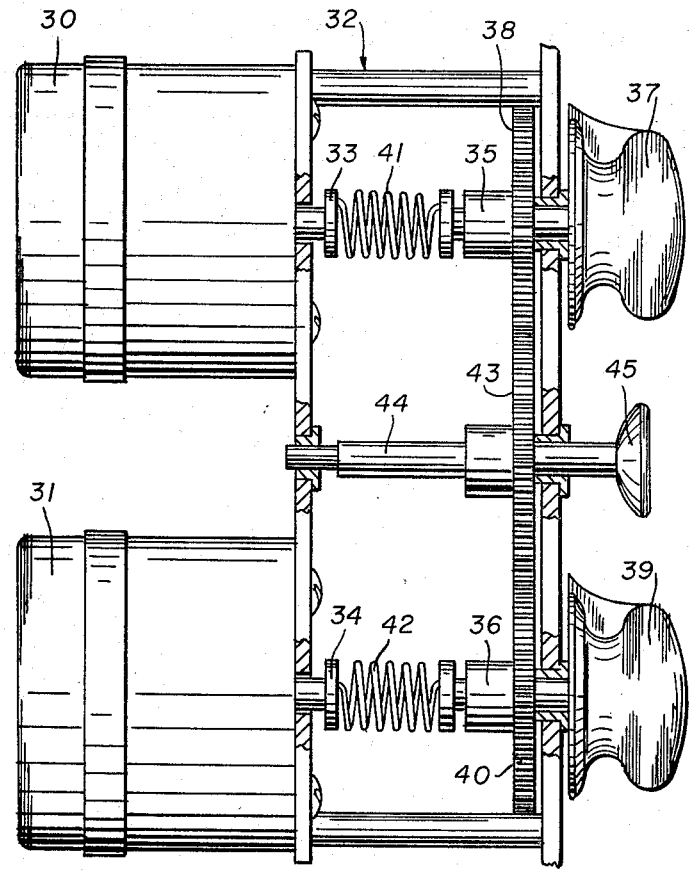

Three embodiments of the invention will now be described with reference to the accompanying drawings in which:

FIGURE 1 illustrates a concentrically mounted ganged control having a spring actuated drive mechanism;
FIGURE 2 illustrates a contiguously mounted ganged control having a spring and gear actuated drive mechanism; and
FIGURE 3 illustrates a contiguously mounted ganged control having a gear actuated drive mechanism.
FIGURES 4, 5 and 6 illustrate various angular settings of the gears shown in FIGURE 3.

Referring now to FIGURE 1 of the drawings, the ganged control comprises a first control 10 and a second control 11 concentrically mounted on a bracket 12. The controls 10 and 11 each have a rotatable control shaft 13 and 14 respectively having a stop or end position. The control shaft 13 runs coaxially through and protrudes beyond the end of the control shaft 14. The drive mechanism comprises a first drive shaft 15 and a second drive shaft 16 rotatably mounted on the bracket 12, concentric with and spaced from the shafts 13 and 14. The shaft 15 also runs coaxially through and protrudes beyond the ends of the shaft 16. A first control knob 17 is pinned to the first drive shaft 15 and a second control knob 18 is pinned to the second drive shaft 16, the latter being interposed between the first control knob 17 and the bracket 12. Both the drive shafts 15 and 16 are free to move axially. A first spiral spring 19 is axially connected at one end to the control shaft 13 and at the other end to the drive shaft 15. A second spiral spring 20, coaxially positioned around the first spring 19, is concentrically connected at one end to the shaft 14 and at the other end to the shaft 16. Both the springs 19 and 20 are under longitudinal tension, thus frictionally holding the knobs 17 and 18 against each other and the knob 18 against the bracket 12. The tension on the springs 19 and 20 is adjusted so that the friction between the knobs 17 and 18 is greater than the friction between the knob 18 and the bracket 12. Therefore, if either of the knobs 17 or 18 is rotated, the complementary one will also rotate. The springs 19 and 20 are also designed to have sufficient torsion to overcome any friction inherent in the controls 10 and 11. Thus, rotating either of the knobs 17 or 18 will simultaneously rotate both of the controls 10 and 11. An angular setting can be set between the two controls 10 and 11 by overcoming the frictional loading between the knobs 17 and 18 and rotating one with respect to the other.

Let us assume that an angular difference is set between the two controls 10 and 11 and that the first control shaft 13 is further advanced from its stop position than the second control shaft 14. If both the shafts 13 and 14 are now rotated towards their stop positions by either of the knobs 17 or 18, the second shaft 14 will reach its stop position before the first shaft 13. Torsion will then begin to build up in the spiral spring 20 and thereby allow the knobs 17 and 18 to be rotated further until the first control shaft 13 has reached its stop position. The knobs 17 and 18 are restrained from rotating when they are let go by the frictional loading between the knobs 17 and 18, and the bracket 12. Later, when the knobs 17 and 18 are again advanced to their original positions, the spiral spring 20 will unwind and the angular setting between the controls 10 and 11 will again be restored.

In the second embodiment illustrated in FIGURE 2 of the drawings, the ganged control comprises a first control 30 and a second control 31 mounted on a bracket 32. The first and second controls 30 and 31 each having a rotatable control shaft 33 and 34 respectively having a stop or end position. The drive mechanism is similar to that illustrated in FIGURE 1 and comprises a first and a second drive shaft 35 and 36 rotatably mounted on the bracket 32, concentric with and spaced from the control shafts 33 and 34, respectively. A first control knob 37 and a first spur gear 38 are pinned to the first drive shaft 35, and a second control knob 39 and a second spur gear 40 are pinned to the second drive shaft 36. A first spiral spring 41 is concentrically connected at one end to the first control shaft 33 and at the other end to the first drive shaft 35, and a second spiral spring 42 is concentrically connected at one end to the second control shaft 34 and at the other end to the second drive shaft 36. Both the spiral springs 41 and 42 are under longitudinal tension. The drive shafts 35 and 36 are not restrained from moving axially and therefore, the longitudinal tension on the springs 41 and 42 causes the knobs 37 and 39 to press against the bracket 32, thereby providing frictional loading between them. The spiral springs 41 and 42 have sufficient rigidity to overcome any friction inherent in the controls 30 and 31 when the drive shafts 35 and 36 are rotated.

An idler spur gear 43, mounted on a shaft 44, is interposed between and engaged with the gears 37 and 38. The shaft 44 also has a button 45 affixed at one end. Under normal operation, rotation of either of the knobs 39 or 40 will simultaneously rotate the control shafts 33 and 34 through the gear train. However, when it is desired to alter the angular setting between the two controls, the idler gear 43 is disengaged from the spur gears 38 and 40 by depressing the button 45 and the controls 30 and 31 can then be independently varied by their respective control knobs 37 and 39. After the controls 30 and 31 have been set to the desired positions, the idler gear 43 is then re-engaged with the spur gears 38 and 40 by pulling the button 45. Thereafter, rotating either of the knobs 39 or 40 will simultaneously rotate both the controls 30 and 31. As described in the first embodiment, when either of the control shafts 33 or 34, being rotated by the knob 37 or 39, strikes its respective stop position before the other, the adjoining spiral spring 41 or 42, will wind up thereby allowing the knobs 37 and 39 to be further rotated until the other control shaft reaches its stop position. If it is desired to operate the controls separately, it is only necessary to disengage the idler gear 43 by pressing the button 45. Thereafter, the control shafts 33 and 34 can be independently varied by rotating the control knobs 37 and 39, respectively.

In the third embodiment illustrated in FIGURES 3, 4, 5 and 6 of the drawings, the ganged control comprises a first control 50 and a second control 51 contiguously mounted on a bracket 52. The controls 50 and 51 each have a rotatable control shaft 53 and 54 respectively having a stop or end position. A first control knob 55 having a concentrically mounted first spur gear 56, is rotatably mounted on the bracket 52. A second spur gear 57 is concentrically and rigidly affixed to the first control shaft 53. A second control knob 58 and a third spur 59 are concentrically and rigidly affixed to the second control shaft 54. A fourth spur gear 60 having an axle 61 is rotatably mounted on the bracket 52 in mesh with the third spur gear 59. A fifth and a sixth spur gear 62 and 63 are connected to each other through a common axle 64 which is coaxially positioned about the axle 61. The gears 62 and 63 are positioned so that they normally engage the gears 56 and 57 respectively. An arcuate segment 65 and 66 of teeth has been removed from each of the gears 57 and 59 respectively. Each of these gears 57 and 59 also has an engaging pin 67 and 68 located parallel to their axes and contiguous to the centre of these arcuate segments 65 and 66. The sixth and fourth gears 63 and 60 each have a substantially radially mounted arm 69 and 70 respectively, which extends beyond the periphery of the gears 63 and 60. One end 71 of the axle 64 is tapered and split so that a locking nut 72, when tightened, will lock the two axles 61 and 64 together. A button 73 affixed to one end of the axle 61 is used to move it axially and thereby engage or disengage the gears 59 and 60.

In normal operation, that is when the gears 59 and 60 are engaged and the axles 61 and 64 are locked together by the locking nut 72, both the controls 50 and 51 are simultaneously varied by rotating the first control knob 55 through the gear train. In the embodiment illustrated in FIGURE 3, the stop positions, heretofore mentioned, are at the extreme counterclockwise settings of the control shafts 53 and 54. The gears 57 and 59 are positioned on their respective control shafts 53 and 54 so that the arcuate segments 65 and 66 are contiguous to the gears 60 and 63 when the control shafts 53 and 54 respectively are against their stop positions in the extreme counterclockwise position. Thus, in this position, the gears 59 and 57 are disengaged from the gears 60 and 63 respectively, thereby allowing the latter gears 60 and 63 to be further rotated in a clockwise direction by the control knob 55 when it is being rotated counterclockwise. The arms 69 and 70 are so positioned that when the gears 60 and 63 are rotated in a counterclockwise direction, the arms 69 and 70 bear against the pins 67 and 68, thereby rotating the gears 57 and 59 into re-engagement with the gears 63 and 60 respectively.

For example, FIGURE 4 illustrates an arrangement where the two control shafts 53 and 54 have the same angular difference with respect to their respective stop positions. Thus, when the gears 60 and 63 are rotated in a clockwise direction by the control knob 55 through the gear train, the gears 57 and 59 are caused to rotate in a counterclockwise direction towards the stop positions of the control shafts 53 and 54 respectively. Since the control shafts 53 and 54 have the same angular difference, the two arcuate segments 65 and 66 will simultaneously disengage the gears 57 and 59 from the gears 63 and 60 respectively. In addition, when the gears 63 and 60 are rotated in a counterclockwise direction by the control knob 55, the arms 69 and 70 will simultaneously bear against the engaging pins 67 and 68 and thereby re-engage the two sets of gears 57 and 63, and 59 and 60. Further clockwise rotation of the control knob 55 will cause the gears 57 and 59, and consequently, the control shafts 53 and 54, to advance in a clockwise direction also.

Let us assume that it is now desired to set an angular difference between the two controls 50 and 51 so that the latter is more advanced in a clockwise direction than the former. First, the locking nut 72 is unscrewed thereby releasing the axles 61 and 64 from each other. The gears 59 and 60 are then disengaged from each other by pulling the button 73 forward. The two controls 50 and 51 can then be independently varied by the two control knobs 55 and 58 to their desired positions. The gears 59 and 60 are then re-engaged by pushing the button 73 in whereafter the locking nut 72 is tightened. FIGURE 5 illustrates a typical example of such a set-up. It can readily be seen that when the control knob 55 is turned in a counterclockwise direction, the gears 60 and 63 rotate in a clockwise direction and the gears 57 and 59 and the control shafts 53 and 54 in a counterclockwise direction. Just as the control shaft 53 strikes its stop position the gears 57 and 63 disengage thereby allowing the gear 59 and consequently the control shaft 54, to be further rotated in a counterclockwise direction by the control knob 55. When the two control shafts 53 and 54 are again advanced to their original settings, the gears 57 and 63 and 59 and 60, will automatically be re-engaged at the proper moment by the arms 69 and 70 and the engaging pins 67 and 68 respectively.

FIGURE 6 illustrates an example of the gears when the control shaft 53 of control 50 is further advanced in a clockwise direction than the control shaft 54 of the control 51. Here again, the angular difference between the two controls will automatically be restored after they have been rotated to their respective stop positions by the control knob 55.

Gears 56 and 62 serve only to reverse the direction of rotation of the control knob 55 so that it will advance the setting of the two controls 50 and 51 when it is turned in a clockwise or conventional manner. If at any time it is desired to operate the two controls 50 and 51 independently, it is only necessary to disengage the gears 59 and 60 by pulling out the button 73 as hereinbefore explained.

What we claim as our invention is:

1. In combination, a drive mechanism, and a ganged control comprising: a first and a second control each having a rotatable control shaft with a stop position; a rotatable control knob; coupling means between each of said shaft and said knob so that both shafts may be turned simultaneously by said knob; means for setting an angular difference between each of said controls with respect to their stop positions, and means for allowing both of said controls to be turned by said knob to their respective stop positions and for automatically restoring said angular difference when said controls are advanced from their stop positions.

2. A combination as defined in claim 1 in which the means for allowing both of the controls to be turned by said knob to their respective stop positions comprises: a first spur gear concentrically affixed to the first knob, a second spur gear concentrically affixed to the rotatable control shaft of the first control, a third spur gear and a second knob concentrically affixed to the rotatable control shaft of the second control, a fourth spur gear rotatably mounted and in mesh with said third spur gear, a fifth and a sixth spur gear each concentrically mounted with and rotatably locked to said fourth spur gear, said fifth and sixth spur gears being engaged with said first and second spur gears respectively, means for automatically disengaging said second and sixth and said third and fourth spur gears respectively when said controls contact their respective stop positions, and means for automatically re-engaging said second and sixth and said third and fourth spur gears respectively.

3. A combination as defined in claim 2 in which the means for automatically disengaging said second and sixth and said third and fourth spur gears respectively comprises an arcuate segment of teeth removed from each of said second and third spur gears so that they disengage from said sixth and fourth spur gears respectively when said controls contact their respective stop positions.

4. A combination as defined in claim 3 in which the means for automatically restoring said angular difference when said controls are advanced from their stop positions comprises a first and a second engaging pin being mounted eccentrically on said second and third spur gears respectively, each of said pins being positioned parallel to the axis of their respective gears, a first arm being mounted substantially radially on said sixth gear and being positioned so that when said sixth gear is rotated, said first arm bears against said first pin and thereby rotates said second gear to re-engage with said sixth gear, and a second arm being mounted substantially radially on said fourth spur gear and being positioned so that when said fourth gear is rotated, said second arm bears against said second pin and thereby rotates said third gear to re-engage with said fourth gear.

5. A combination as defined in claim 4 in which the means for setting an angular difference between each of said controls with respect to their stop positions comprises means for rotatably disengaging said fourth spur gear from said fifth and sixth spur gears.

6. In combination, a drive mechanism and a ganged control comprising: first and second controls each having a rotatable control shaft with a stop position; first and second rotatable control knobs; a first helical spring concentrically connected at one end to the shaft of the first control and at the other end to said first rotatable control knob, and a second helical spring concentrically connected at one end to the shaft of the second control and at the other end to the second rotatable control knob; said knobs being disengageably coupled to each other.

7. A combination as defined in claim 6 in which the first and second controls are coaxially mounted on a bracket, the knobs are concentrically mounted on said bracket so that opposite sides of the second knob are contiguous to said bracket and one side of the first knob respectively, and the spiral springs are coaxially disposed under longitudinal tension between said controls and said knobs, so that there is friction loading between the adjacent sides of said knobs and there is friction loading between the adjacent side of the second knob and said bracket, the latter loading being less than the former.

8. A combination as defined in claim 6 which includes a first spur gear concentrically affixed to the first knob, a second spur gear concentrically affixed to the second knob, an idler spur gear interposed between and in mesh with said first and second spur gears, means for disengaging said idler spur gear from said first and second spur gears so that said first and second knobs can be independently rotated.

References Cited by the Examiner
UNITED STATES PATENTS 2,941,175  6/1960  Zarrillo _____ 338—134

MILTON KAUFMAN, *Primary Examiner.*